(12) United States Patent
Sandwall

(10) Patent No.: US 11,060,552 B2
(45) Date of Patent: Jul. 13, 2021

(54) SCREW-RETAINING DEVICE AND SCREW-RETAINING KIT

(71) Applicant: HUSQVARNA AB, Huskvarna (SE)

(72) Inventor: Johan Sandwall, Gråbo (SE)

(73) Assignee: HUSQVARNA AB, Huskvarna (SE)

( * ) Notice: Subject to any disclaimer, the term of this patent is extended or adjusted under 35 U.S.C. 154(b) by 229 days.

(21) Appl. No.: 16/465,681

(22) PCT Filed: Nov. 15, 2017

(86) PCT No.: PCT/SE2017/051132
§ 371 (c)(1),
(2) Date: May 31, 2019

(87) PCT Pub. No.: WO2018/101873
PCT Pub. Date: Jun. 7, 2018

(65) Prior Publication Data
US 2019/0293108 A1     Sep. 26, 2019

(30) Foreign Application Priority Data

Dec. 1, 2016 (SE) .................... 1651579-3

(51) Int. Cl.
*F16B 41/00* (2006.01)
*F16B 43/00* (2006.01)
(Continued)

(52) U.S. Cl.
CPC ............ *F16B 41/002* (2013.01); *F16B 43/00* (2013.01); *B28D 7/00* (2013.01); *F16B 21/20* (2013.01); *F16B 41/00* (2013.01)

(58) Field of Classification Search
CPC .......... F16B 21/06; F16B 21/20; F16B 37/04; F16B 37/0842; F16B 37/0857; F16B 41/00; F16B 41/002; F16B 43/00; B28D 7/00
(Continued)

(56) References Cited

U.S. PATENT DOCUMENTS 774,033 A     11/1904   Blanding
1,209,460 A * 12/1916   Lowe .................... F16B 41/002
                                                    411/353
(Continued)

FOREIGN PATENT DOCUMENTS

DE     7714379 U1    9/1977
DE     41 30 415 C1  3/1993
(Continued)

OTHER PUBLICATIONS

International Search Report and Written Opinion for International Application No. PCT/SE2017/051132 dated Feb. 8, 2018.
(Continued)

*Primary Examiner* — Roberta S Delisle
(74) *Attorney, Agent, or Firm* — Burr & Forman, LLP

(57) ABSTRACT

The present disclosure relates to a screw-retaining device (1) comprising a connecting element (2) which in turn comprises a first end part (3), a second end part (4) and an intermediate part (5) that connects the end parts (3, 4). The first end part (3) comprises an at least mainly circumferentially running part (6) that at least partly encompasses a retaining aperture (7) that is arranged to engage the threads (9) of a screw (100), and the second end part (4) is attached to an object (8). The screw-retaining device (1) further comprises a washer part (20) with a first and second washer portion (21, 22), having a corresponding first and second washer aperture (23, 24). The washer portions (20, 22) are
(Continued)

connected and spaced apart by a gap (26), and the washer apertures (23, 24) admit passage of a screw stem (19). The first end part (3) is arranged to be positioned in the gap (26) before a screw (100) that is intended to be retained is mounted to the screw-retaining device (1) via the retaining aperture (7) and the washer apertures (23, 24). The present disclosure also relates to a screw-retaining kit.

12 Claims, 8 Drawing Sheets

(51) Int. Cl.
  *B28D 7/00* (2006.01)
  *F16B 21/20* (2006.01)
(58) Field of Classification Search
  USPC ....... 411/352, 353, 383, 511, 520, 531, 533, 411/547, 999
  See application file for complete search history.

(56) References Cited

U.S. PATENT DOCUMENTS

| | | | |
|---|---|---|---|
| 1,634,744 A | | 7/1927 | Edwards |
| 2,236,850 A | * | 4/1941 | Hansman ............... F16B 37/041 |
| | | | 411/174 |
| 2,389,344 A | * | 11/1945 | Alvin ........................ F16B 5/10 |
| | | | 411/555 |
| 3,175,453 A | * | 3/1965 | Williams ................ F16B 21/12 |
| | | | 411/352 |
| 3,295,874 A | | 1/1967 | Allen |
| 3,340,494 A | | 9/1967 | Gutshall |
| 4,302,066 A | | 11/1981 | Newman et al. |
| 4,817,450 A | * | 4/1989 | Jachim ................ F16L 55/1155 |
| | | | 220/375 |
| 4,859,977 A | | 8/1989 | Mochizuki et al. |
| 5,102,003 A | * | 4/1992 | Oswald .............. F01M 11/0408 |
| | | | 220/230 |
| 5,380,325 A | | 1/1995 | Lahille et al. |
| 6,106,207 A | * | 8/2000 | Kuzdak, III .......... F16B 41/002 |
| | | | 411/107 |
| 6,842,949 B2 | * | 1/2005 | Warren .................... F16G 11/06 |
| | | | 24/115 H |
| 7,192,234 B2 | | 3/2007 | Anderson et al. |
| 7,401,766 B2 | | 7/2008 | Schorloff et al. |
| 8,740,529 B2 | * | 6/2014 | Martinsson ............. B27B 17/14 |
| | | | 411/353 |
| 8,784,028 B2 | | 7/2014 | Clark |
| 8,845,255 B2 | * | 9/2014 | Bernhard .............. F16B 41/002 |
| | | | 411/383 |
| 8,882,424 B2 | | 11/2014 | Naruse |
| 2001/0048860 A1 | | 12/2001 | Ross et al. |
| 2015/0192168 A1 | * | 7/2015 | Chen ..................... F16B 41/002 |
| | | | 411/511 |

FOREIGN PATENT DOCUMENTS

| | | |
|---|---|---|
| DE | 20010252 U1 | 8/2000 |
| DE | 20 2010 001 511 U1 | 12/2010 |
| DE | 10 2010 035 350 A1 | 3/2012 |
| DE | 10 2014 107 441 A1 | 12/2014 |
| DE | 102013008983 A1 | 12/2014 |
| DE | 10 2014 218 545 A1 | 3/2016 |
| EP | 2 447 552 A1 | 5/2012 |
| EP | 2452771 A1 | 5/2012 |
| EP | 2 278 177 B1 | 10/2016 |
| JP | H03-61710 A | 3/1991 |

OTHER PUBLICATIONS

International Preliminary Report on Patentability for International Application No. PCT/SE2017/051132 dated Jun. 4, 2019.
"Pan Pacific HRC1SET Washer Set, Captive Screw & Retaining Clip," retrieved from Internet URL: https://hermanproav.com/product/31924/Pan-Pacific-HRC1SET-Washer-Set--Captive-Screw-And-Retaining-Clip on Jun. 6, 2019, pp. 4.
"Screen Caps With Lanyards & Captive Screws," retrieved from Internet URL: https://www,digikey.com/en/product-highlight/c/conec/industrial-connectors on Jun. 6, 2019, pp. 2.
"M16 Bolt With Captive Ratchet Wrench," retrieved from Internet URL: http://www.specialty-fasteners.co.uk/sector/specials-design-23/m16-bolt-with-captive-ratchet-wrench, on Jun. 6, 2019, pp. 2.

* cited by examiner

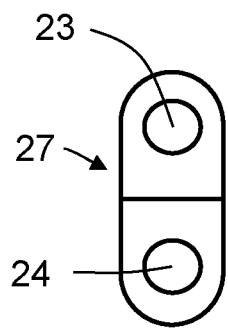 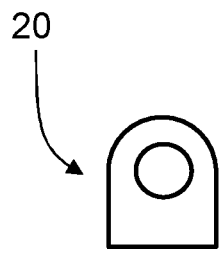 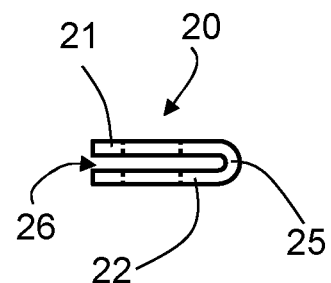
FIG. 5A  FIG. 5B  FIG. 5C
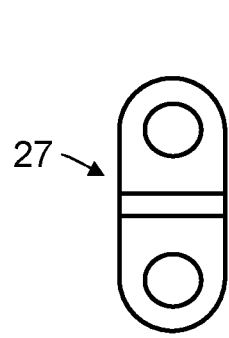 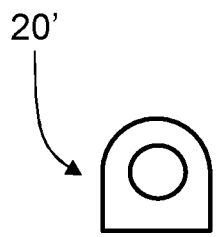 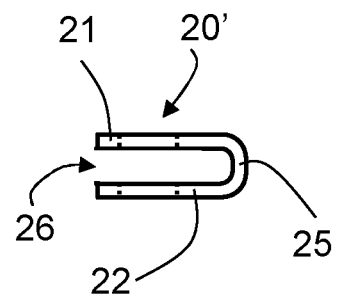
FIG. 6A  FIG. 6B  FIG. 6C

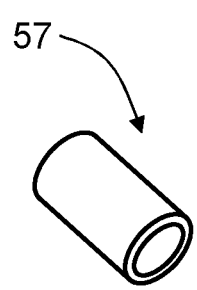
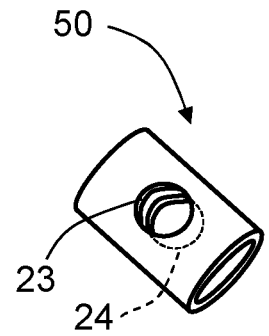
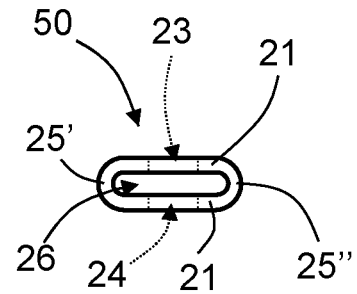
FIG. 9A     FIG. 9B     FIG. 9C
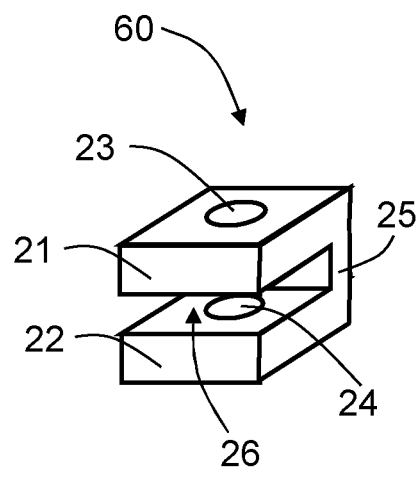
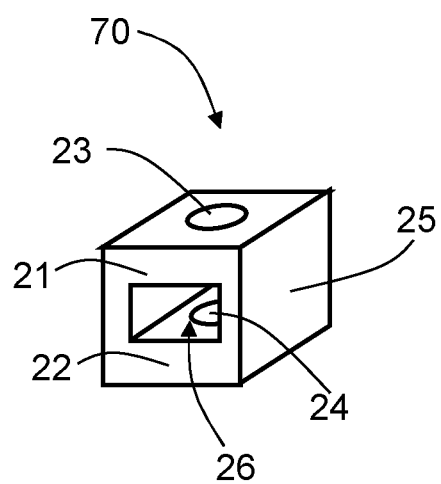
FIG. 10     FIG. 11

SCREW-RETAINING DEVICE AND SCREW-RETAINING KIT

TECHNICAL FIELD

The present disclosure relates to a screw-retaining device that comprises a connecting element which in turn comprises a first end part, a second end part and an intermediate part that connects the end parts.

BACKGROUND

For certain machines there is a desire, or even a demand, that fastening elements shall not be lost. One such application is for example protective covers or blade guards for moving elements in a machine, e.g. a cutting disc or cutting blade of a cutting machine, a transmission or other moving parts of an engine. There may of course be other parts which may be covered for other reasons, e.g. to protect the contact with a hot element in a machine or for preventing dirt or dust to enter machine parts. Protective covers which are essential for the safety of a person using a machine should be thoroughly fastened and in many cases screws are used. In general, there is also a desire to occasionally remove these protective covers in order to access the covered parts, e.g. for maintenance, cleaning or replacement of certain parts. To assure that the protective cover will be reassembled properly, there may be some kind of arrangement preventing that a screw or other fastening element is lost by having it attached to the cover or machine also when the screw is unscrewed. These kinds of safety arrangement for preventing loss of a screw are commonly referred to as captive screws or screw-retaining arrangements.

Different captive screws or screw-retaining arrangements are for example disclosed in U.S. Pat. No. 3,295,874; DE 10 2014 218 545; DE 10 2014 107 441; and DE 77 143 79. These documents disclose different designs of captive screws. These arrangements aim to retain the screw in the hole and not allow it to be released completely from the hole in an easy way but stay in the hole even when unscrewed. However, there may be a desire to completely release the screw from its associated hole or bore. One reason could be that there is a need to change a screw or bolt and it is thus desired to remove it. In this case it is also a problem if some kind of specifically customized screw is used since it may be hard to find and replace. The arrangements described above often use a customized screw.

There are also known examples of screw-retaining arrangements which allow the screw to be completely separated from its hole or bore while still being attached to the device by a tether. Such arrangements are for example disclosed in DE 4130415, U.S. Pat. No. 8,882,424; US 2001/048860; EP 2278177; and EP 2447552. All these documents disclose the use of standard screws which may be used in the retaining arrangements disclosed therein. These documents thus disclose how an ordinary screw may be retained while allowing it to be completely separated from its bore while also avoiding the need of individually customized screws.

However, even though the above documents provide different solutions on captive screws or screw-retaining arrangements, there is still a need to provide an uncomplicated screw-retaining device with improved endurance which is less likely to be worn when the screw is screwed and unscrewed several times.

SUMMARY

It is an object of the present disclosure to provide an uncomplicated screw-retaining device with improved endurance which is less likely to be worn when the screw is screwed and unscrewed several times.

This object is addressed by the present disclosure, which provides a screw-retaining device comprising a connecting element which in turn comprises a first end part, a second end part and an intermediate part that connects the end parts. The first end part comprises an at least mainly circumferentially running part that at least partly encompasses a retaining aperture that is arranged to engage the threads of a screw that is intended to be retained, and the second end part is arranged to be attached to an object. The screw-retaining device further comprises a washer part which in turn comprises a first washer portion, having a first washer aperture, and a second washer portion, having a second washer aperture. The washer portions are spaced apart by a gap and are connected by at least one connecting washer portion. The washer apertures are aligned across the gap such that a combined washer aperture is formed that admits passage of a screw stem. The first end part is arranged to be positioned in the gap before a screw that is intended to be retained is mounted to the screw-retaining device via the retaining aperture and the washer apertures.

According to an example, a diameter of a largest circle within the retaining aperture in a relaxed state falls below a largest thread diameter of a screw that is intended to be retained.

According to another example, the retaining aperture is arranged to be aligned with the washer apertures.

According to another example, the retaining aperture has an elongated form in a relaxed state, and is arranged to have said elongated form temporarily altered from the relaxed state to an expanded state such that an expanded retaining aperture is formed. The diameter of a largest circle within the expanded retaining aperture is increased to an expanded circle diameter.

According to another example, the washer part is made from thin sheet metal or a flattened thin walled pipe.

According to another example, the sheet metal forming the washer part is bent such that the first washer portion and second washer portion of the washer comprise two parallel flat surfaces that are arranged to be perpendicular to the longitudinal direction of a screw when the washer part is fitted onto the screw stem. Said first washer portion and second washer portion are connected by an intermediate bent portion or portions serving as the third connecting part.

According to another example, said first end part of the connecting element is in the shape of a loop.

According to another example, a screw-retaining kit comprises the above screw-retaining device in combination with a screw.

This object is also addressed by an engine-powered tool that comprises the above screw-retaining kit.

A plurality of advantages is provided by means of the present disclosure. Mainly, an uncomplicated screw-retaining device with improved endurance is provided, where the screw-retaining device is less likely to be worn when the screw is screwed and unscrewed several times in comparison with state of the art screw-retaining devices.

BRIEF DESCRIPTION OF THE DRAWINGS

The present disclosure will now be described more in detail with reference to the appended drawings, where:

FIG. 5A schematically shows a top view of a first example of a washer part during manufacture;

FIG. 5B schematically shows a top view of the first example of a washer part;

FIG. 5C schematically shows a side view of the first example of a washer part;

FIG. 6A schematically shows a top view of a second example of a washer part during manufacture;

FIG. 6B schematically shows a top view of the second example of a washer part;

FIG. 6C schematically shows a side view of the second example of a washer part;

FIG. 9A schematically shows perspective view of a sixth example of a washer part during manufacture;

FIG. 9B schematically shows a perspective view of the sixth example of a washer part;

FIG. 9C schematically shows a side view of the sixth example of a washer part;

FIG. 10 schematically shows a perspective view of a seventh example of a washer part;

FIG. 11 schematically shows a perspective view of an eighth example of a washer part;

DETAILED DESCRIPTION

Figure 1:
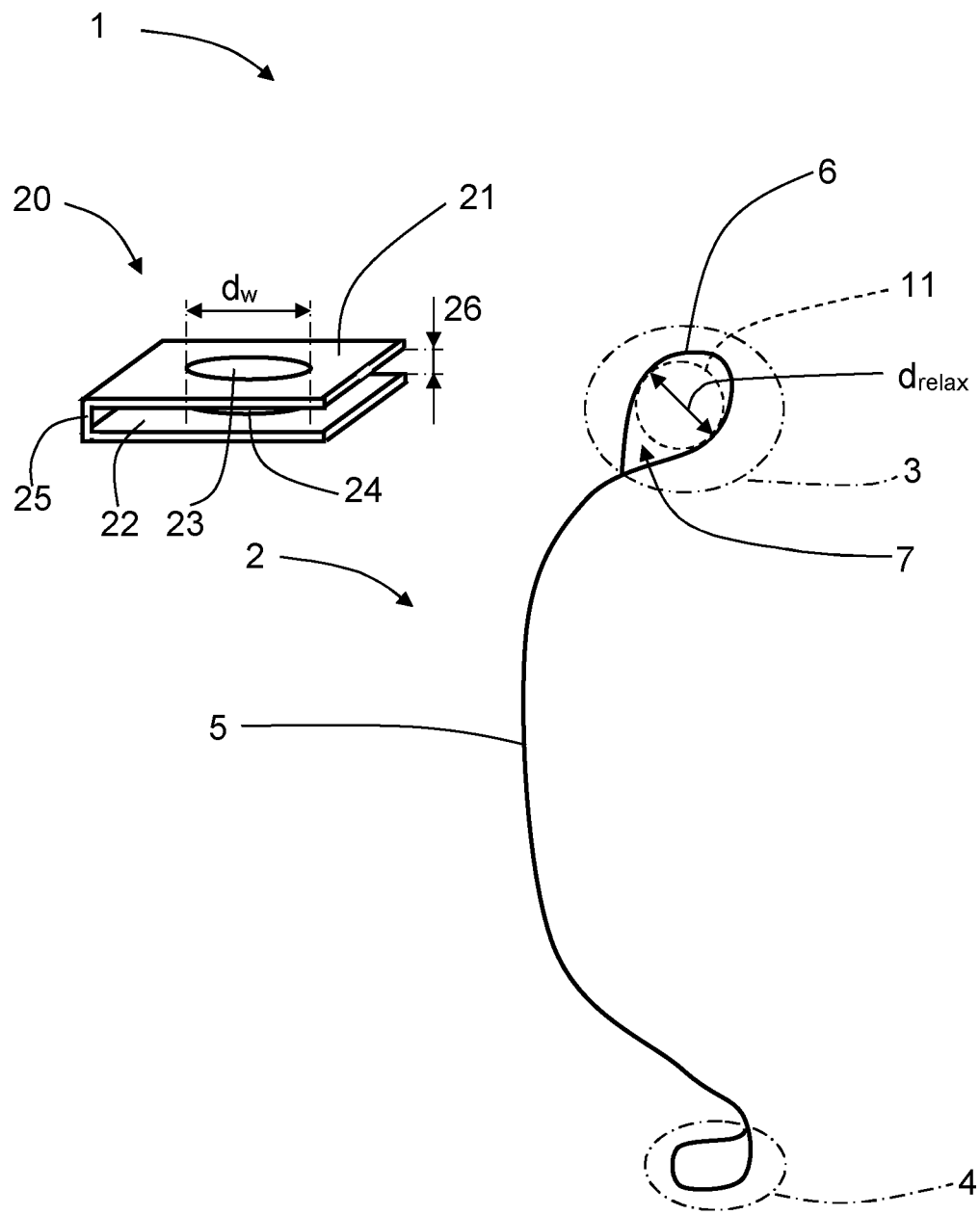
FIG. 1 schematically shows a screw-retaining device, comprising a connecting part and a washer part, and a screw to be retained.
Figure 2:
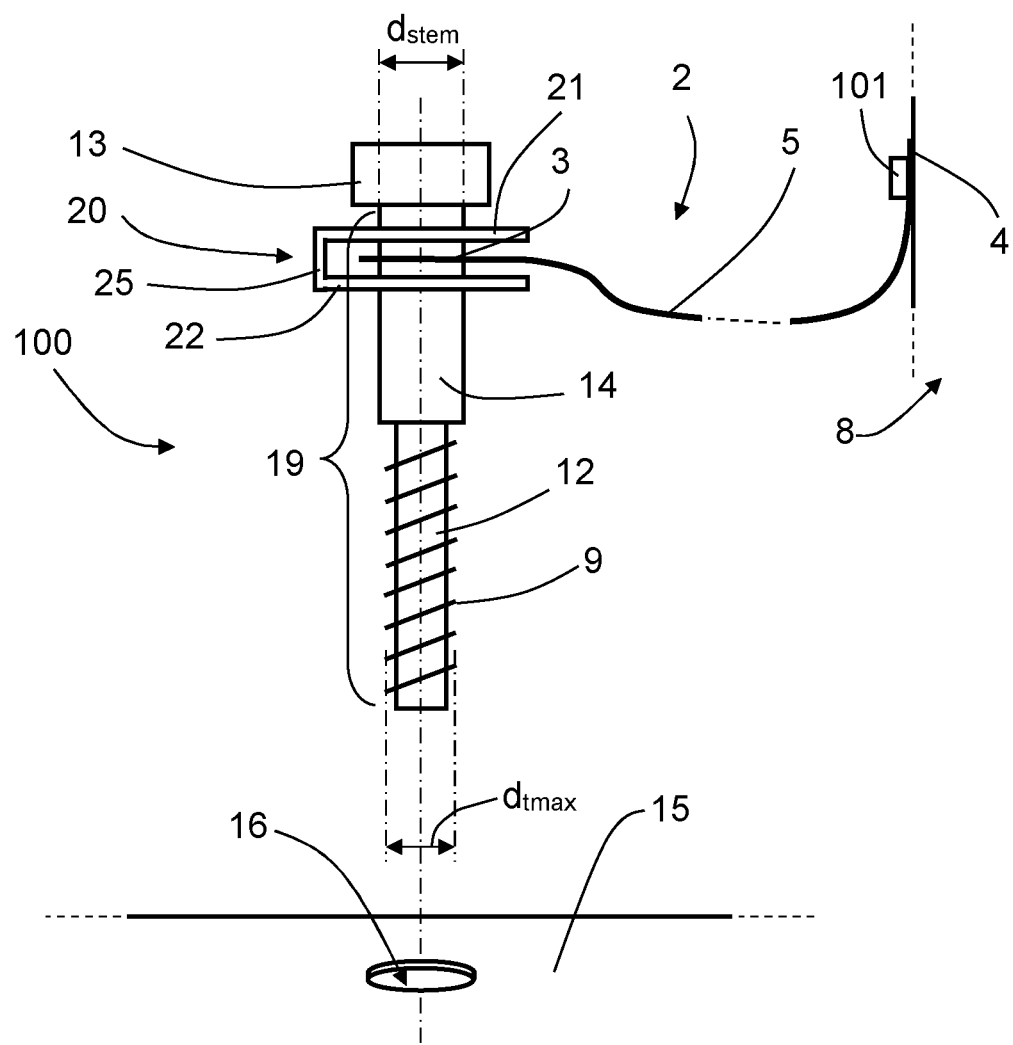
FIG. 2 schematically shows the screw-retaining device fitted onto a screw.

FIG. 1 discloses a first example of a screw-retaining device 1 adapted for securing a screw 100, and FIG. 2 shows the screw-retaining device 1 when attached to a screw 100 and an attachment point in the form of an object. The screw-retaining device 1 comprises a connecting element 2, here in the form of a tether, which in turn comprises a first end part 3, a second end part 4, and an intermediate part 5 that connects the end parts 3, 4.

Figure 3A:
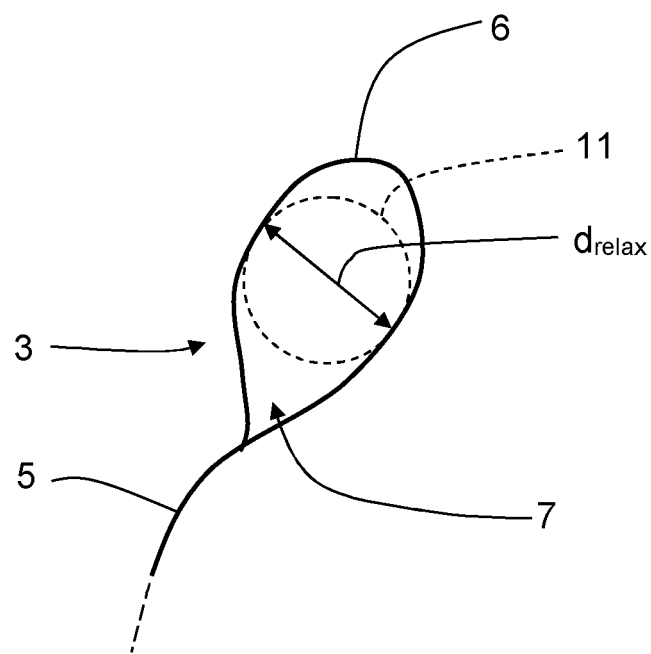
FIG. 3A schematically shows a first example of a first end part in a relaxed state.

The first end part 3 functions as a retaining portion and comprises an at least mainly circumferentially running part 6 that at least partly encompasses a retaining aperture 7 that is arranged to engage the threads 9 of a screw 100 that is intended to be retained, and where the second end part 4 is arranged to be attached to an object 8. In this example, in order for the retaining aperture 7 to engage said threads 9, the retaining aperture 7 is flexible and has a relaxed state where it is mainly drop-shaped as shown in FIG. 1 and also in FIG. 3A that shows a first detailed view of the first end part 3. The tether 2 is here exemplified by a wire which at each of its two ends has been provided with a corresponding loop in order to serve as the first end part 3 and the a second end part 5, where the end parts 3, 4 are connected by an intermediate portion of the cable serving as the intermediate part 5.

The retaining aperture 7 then has a relaxed circle diameter $d_{relax}$ of a largest circle 11 within the retaining aperture 7 in a relaxed state, where the relaxed circle diameter $d_{relax}$ falls below the largest thread diameter $d_{tmax}$ of a screw 100 that is intended to be retained.

Figure 3B:
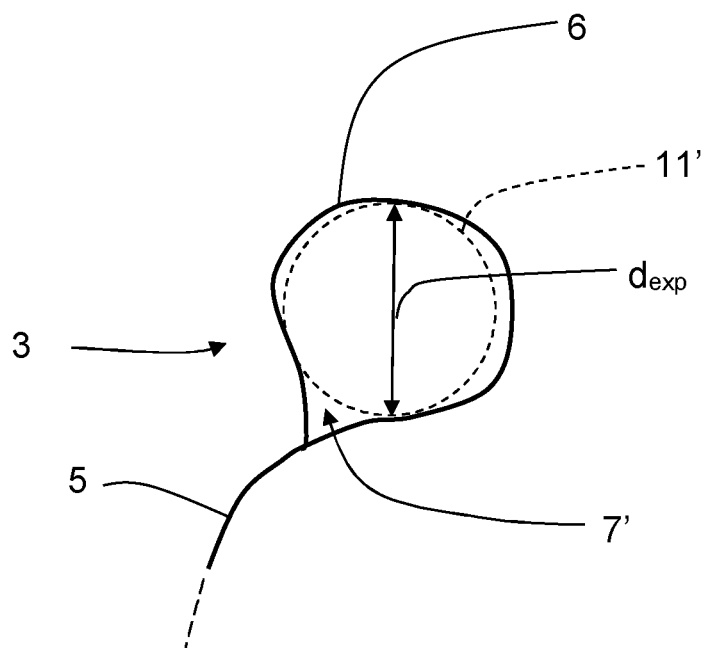
FIG. 3B schematically shows a first example of a first end part in an expanded state.

The screw 100 in this example comprises a screw head 13, a screw stem 19 comprising a thread portion 12 where the threads run, and an upper stem part 14 without threads, where the upper stem part 14 is positioned between the thread portion 12 and the screw head 13 and has a stem diameter $d_{stem}$ that exceeds the largest thread diameter $d_{tmax}$. With reference also to FIG. 3B that shows a second detailed view of the first end part 3, in order to allow the retaining aperture 7 to move along the upper stem part 14 towards the screw head 13, the retaining aperture 7 can be temporarily altered from the relaxed state to an expanded state such that an expanded retaining aperture 7' is formed where said diameter of a largest circle 11' within the expanded retaining aperture 7' is increased to an expanded circle diameter $d_{exp}$. When the retaining aperture 7 is moved away from the screw head 13 and leaves the upper stem part 14, it will resume its initial form. According to some aspects, when the tether 2 is in the form of a wire, the wire has a thickness which is less than twice the thread pitch of the thread portion 12.

This means that the loop of the first end part 3 according to some aspects is made such that it will strive to squeeze slightly around the upper stem part 14 of the screw 100. This may for example be accomplished by having a loop in the retaining portion 3 which is designed somewhat oval or drop-shaped in its relaxed state, and adapted in its size, such that it needs to be squeezed and reshaped to be somewhat more circular in order to fit onto the upper stem part 14. The size can for example be made such that it will be almost necessary to screw it onto the screw and not able to easily run along the thread portion 12 without being screwed.

The retaining aperture 7 will move along the upper stem part 14 towards the screw head 13 when the screw is fixed into a receiving nut. In the above described arrangement, there is a risk that the first end part 3 will be worn if the screw 100 is screwed and unscrewed several times, e.g. for assembling and disassembling a machine cover 15 as schematically indicated in FIG. 2. In many cases, the first end part 3 that is used for gripping or securing the screw 100 is clamped between the screw head 13 and the edge of a bore 16 where the screw is fitted. The first end part 3 can then be subject to rather high compressive forces when being clamped between the screw head 13 and the edges or surface area surrounding of the bore 16 since it is generally desired to apply a relatively high torque to attach it safely. In addition to the compressive forces there will also be friction forces from the turning motion of the screw 100 and its head relative the edges of the bore 16.

Therefore, according to the present disclosure, the screw-retaining device 1 further comprises a washer part 20 which in turn comprises a first washer portion 21, having a first washer aperture 23, and a second washer portion 22, having a second washer aperture 24. The washer portions 20, 22 are spaced apart by a gap 26 and are connected by a connecting washer portion 25. The first washer portion 21 is intended to abut against screw head 13, and the second washer portion 22 is intended to abut against the edge of a hole or bore 16 where the screw 100 is intended to fit. According to some aspects, the gap 26 is designed such that the first end part 3 will be closely fitted into the gap 26. This can aid in the retaining properties for the retaining device 1.

The washer apertures 23, 24 are aligned across the gap 26 such that a combined washer aperture 23, 24 is formed that admits passage of the screw 100 having said largest thread diameter $d_{tmax}$; here the washer apertures 23, 24 each have a corresponding washer aperture diameter $d_w$ that exceeds said largest thread diameter $d_{tmax}$. The first end part 3 is arranged to be positioned in the gap 26 before the screw 100 that is intended to be retained is mounted to the screw-retaining device 1 via the retaining aperture 7 and the washer apertures 23, 24 as shown in FIG. 2. Suitably, the retaining aperture 7 is arranged to be aligned with the washer apertures 23, 24 before the screw 100 is inserted.

The object 8 that the second end part 4 is attached to can be the machine cover 15 or any other suitable shielding element on a machine. The second end part 4 is according to some aspects attached by means of an attachment screw 101 as shown in FIG. 2.

When the screw 100 is fitted into the bore 16 and attached to a corresponding nut or similar (not shown), the second washer portion 22 will abut against the edge of the bore 16. While applying a turning torque to the screw 100 in order to attach it in the bore 16 there will be a compressive force working on the washer part 20 from its abutment with its first washer portion 21 against the screw head 13 and its abutment with its second washer portion 22 with the edges of the bore 16. The connecting washer portion 25 will thus be subject to the compressive forces from the torque arising from the screw 100 and by absorbing compressive forces, the forces working on the first end part 3 of the tether 2 located in the gap 26 of the washer part 20 are reduced. The planar surfaces of the two washer portions 21, 22 will contribute to reduce the wear compared to if there were no washer part 20, and the resiliency of the washer part 20 can also contribute to better retain the screw 100 in the bore 16 when being attached therein.

When the screw 100 is unscrewed, released from the bore 16 and dropped, the retaining device 1 can retain the screw by means of the slight squeeze applied around the upper stem part 14 by the first end part 3. Should the retaining device 1 be moved towards the thread portion 12, the loop of the first end part 3 will assume its relaxed state, where its configuration will not allow the retainage aperture 7 to pass the threads 9. Since the second end part 4 is attached to an object 8 in a suitable manner, the screw will be retained. Since the first end part 3 is positioned in the gap 26 as described previously, the washer part 20 will be retained as well.

Figure 4A:
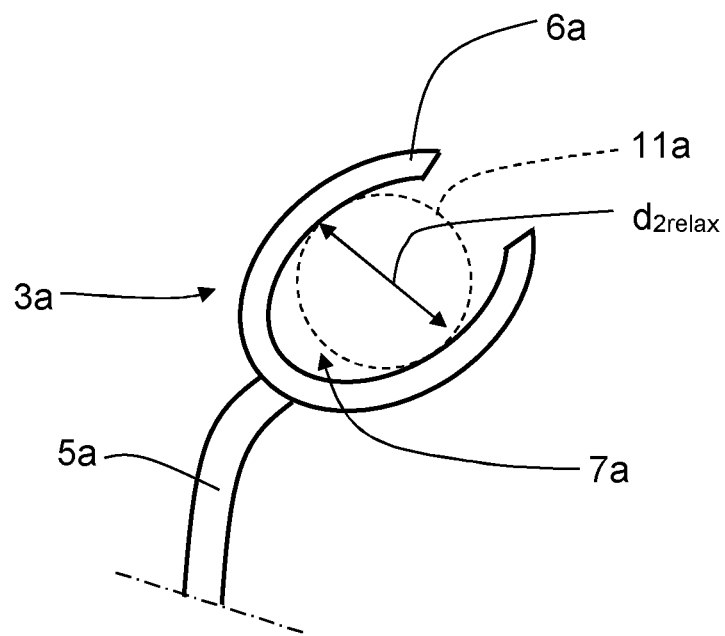
FIG. 4A schematically shows a second example of a first end part in a relaxed state.

The desired functionality can be obtained by means of many types of end parts. In FIG. 4A, showing a second example and corresponding to FIG. 3A, the tether 2 comprises a first end part 3a that comprises an at least mainly circumferentially running part 6a in the form of a c-shaped clip or c-washer 6a that in turn is connected to an intermediate part 5a in the form of a metal ribbon. As in the first example, there is a retaining aperture 7a that has a relaxed circle diameter $d_{2relax}$ of a largest circle 11a within the retaining aperture 7a in a relaxed state, where said relaxed circle diameter $d_{2relax}$ falls below the largest thread diameter $d_{tmax}$ of a screw 100 that is intended to be retained.

Figure 4B:
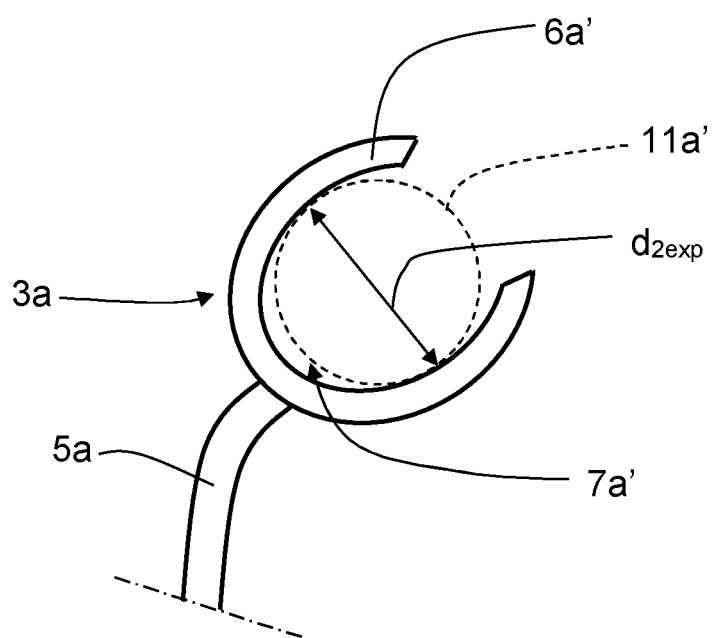
FIG. 4B schematically shows a second example of a first end part in an expanded state.

With reference also to FIG. 4B that corresponds to FIG. 3B, the retaining aperture 7a is temporarily altered from the relaxed state to an expanded state such that an expanded retaining aperture 7a' is formed where said diameter of a largest circle 11a' within the expanded retaining aperture 7a' is increased to an expanded circle diameter $d_{2exp}$. This will occur when first end part 3a is moved towards the screw head along the upper stem part 14 from the threaded portion, and when the retaining aperture 7a is moved away from the screw head and leaves the upper stem part 14, it will resume its initial form.

Generally, the first end part 3, 3a thus comprises an at least mainly circumferentially running part 6, 6a that at least partly encompasses a retaining aperture 7, 7a that is arranged to engage the threads 9 of a screw 100 that is intended to be retained The washer part 20 is in this embodiment made from a piece of sheet metal such as an oblong washer plate. The oblong plate has been bent at its middle almost 180 degrees to produce two washer portions 21, 22 being spaced apart by the relatively narrow gap 26 and held together by the bent portion serving as the connecting washer portion 25. The first washer portion 21 and second washer portion 21, 22 have each been provided with a respective washer aperture 23, 24 in order to be able to be fitted onto a screw 100.

FIG. 5A discloses an oblong washer 27 as it looks before it is bent and shaped to form a washer part 20 according to a first example for washer parts, where the sheet material used is made of metal. The oblong washer plate 27 is provided with rounded corners and a washer aperture 23, 24 on each respective side. In FIG. 5B, the washer plate 27 in FIG. 5A has been bent at its half-length, and the washer apertures 23, 24 are aligned to overlap each other in order to shape the washer part 20. In FIG. 5C, which is a side view of the washer part 20 in FIG. 5B, it is shown that there is a gap 26 created between the first part 21 and the second part 22 connected by the connecting washer portion 25.

FIG. 6A-C disclose a second example of somewhat different washer part 20' which essentially looks the same as the one described in FIGS. 5A-C, but with the difference that this washer part 20' is made by bending the washer plate 27 (which is the same as in FIG. 5A) essentially 90 degrees at two bending lines close to the centerline so as to create a larger gap 26' between the first part 21 and the second part 22. This may in particular be desired for somewhat larger dimensions of the screw 100 and/or the first end part 3 of the tether 2, see FIG. 1.

The gap 26 is preferably made such that it is somewhat wider than the width of the first end part 3 such that it can fit. The thickness of the sheet metal may vary depending on the use and the dimensions of the screw, but a thickness between 0.5 and 2 mm is according to some aspects suitable for most applications. For example, a sheet metal having a thickness of 1 mm could be used to be bent around 180 degrees creating a gap of around 2 mm. This could for example be suitable for screws having a diameter of 4 to 8 mm.

The thickness is for example depending on the desired load bearing properties for preventing the washer part 20 to be squeezed and deformed. A thicker sheet may better resist the compressive forces. Also, the choice of material for the sheet material is important concerning its load bearing properties and how the bent portion serving as the third connecting portion may resist deformation.

In order to fit the bent sheet metal to a screw, each of the washer portions 21, 22 of the washer part are here provided with a corresponding through-going hole or washer aperture 23, 24, which washer apertures 23, 24 are designed to overlap each other such that a screw stem 19 may be fitted through the washer aperture 23, 24. In the manufacturing process, the washer aperture 23, 24 can be made either before the sheet metal 27 is bent, or afterwards. In case the washer aperture 23, 24 are made afterwards, it is in general easier to assure that the washer aperture 23, 24 are aligned.

Figures 7A, 7B, 7C, 7D:
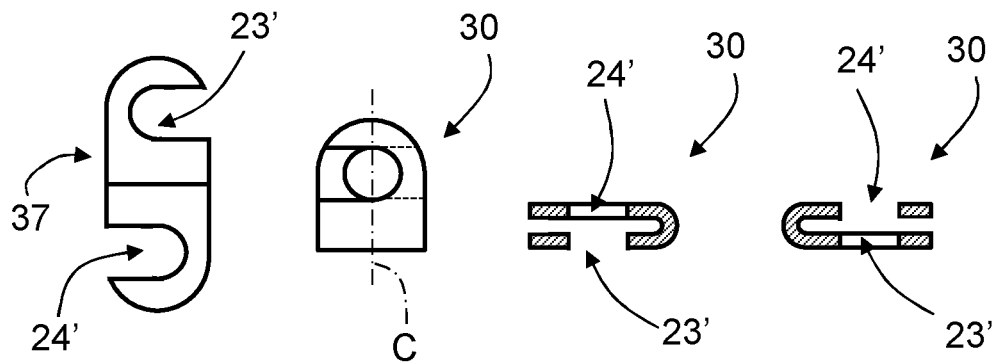
FIG. 7A schematically shows a top view of a third example of a washer part during manufacture.
FIG. 7B schematically shows a top view of the third example of a washer part.
FIG. 7C schematically shows a first side sectional view of the third example of a washer part.
FIG. 7D schematically shows a second side sectional view of the third example of a washer part.

FIGS. 7A-C disclose a third example of a washer part 30 that also is made from a sheet material, but the washer plate 37 used as the starting material is designed somewhat different compared to the washer plate used for the washer parts in FIGS. 5A-C and 6A-C. In this case, the washer plate 37 as shown in FIG. 7A is designed with two slits 23', 24' which are designed to face opposite sides of the washer plate 37 and here constitute the washer apertures. When the washer plate 37 is bent, the slits 23', 24' will partly overlap by its central portions such that the slits 23', 24' together form a through-going hole having edges all around the hole as shown in FIG. 7B disclosing a view perpendicular to the flat surface of the washer part 30. The washer apertures 23', 24' are thus here only partially enclosed.

However, in FIG. 7C, disclosing a view of the washer part in FIG. 7B cut in two halves along a centerline C, it can be seen that only the slit 23' in a first washer portion 21 will have an edge at one side while, of course, the other half as disclosed in the corresponding FIG. 7D, will provide an edge by a second washer portion 22 by the other slit 24' for the other side. Hence, the washer part 30 may be safely attached to the screw stem 19 by the through-going hole created by the slits 23', 24'.

Figures 8A, 8B, 8C:
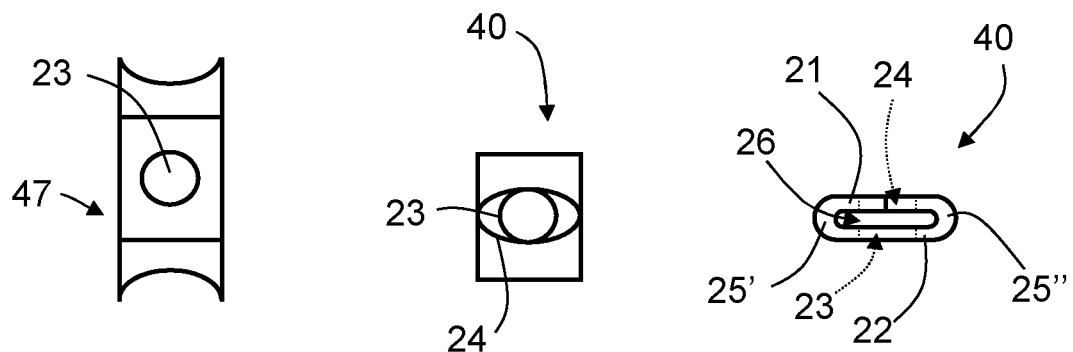
FIG. 8A schematically shows a top view of a fourth example of a washer part during manufacture.
FIG. 8B schematically shows a top view of the fourth example of a washer part.
FIG. 8C schematically shows a side view of the fourth example of a washer part.

In FIGS. 8A-C, still another washer part 40 is disclosed. A washer plate 47 is used as starting material in this example as well, but this washer plate is designed differently than the ones disclosed in previous Figures. In this case, the washer plate 47 as shown in FIG. 8A is designed to be curved inwards at its ends and thus differs in this aspect from the washer plates in FIGS. 5 to 7 which are bent outwards. The curved ends serve to allow the screw stem 19 to fit between the ends when the washer plate 47 is bent. The ends could be designed differently to fit the screw stem 19, e.g. an indentation at each end having the shape of a half circle adapted to the diameter of a screw.

In this case, there is also a first washer aperture 23 provided in the washer plate 47, in its central part, and the end portions will be bent, about 180 degrees, and have a shape as seen from above as disclosed in FIG. 2B, and appears as shown in FIG. 2C when seen from the side. In this case, there will thus still be a first washer portion 21 and a second washer portion 22 providing essentially planar surfaces to abut against the edges of a bore or hole and against the head of a screw. Hence, the middle portion of the washer plate 47, which is a flat portion provided with a washer aperture 23, is denoted to be the second washer portion 22 while the ends of the washer plate will form the first washer portion 21.

The connecting washer portions 25', 25" will thus correspond to the two bent portions creating a distance and a gap 26 between the first washer portion 21 and second washer portion 22. The curved portions at the ends will form a second washer aperture 24 that will aid the first washer aperture 23 in aligning the screw. This design may have the advantage in view of the designs described above in FIGS. 5 to 7 in that it may better resist compressive forces since the connecting washer portions 25', 25" are acting on two opposite sides instead of one single side. However, the embodiments described in FIGS. 5 and 6 will have continuously planar surfaces abutting against the bore 16 and the head 13 of the screw 100 which also can be beneficial.

Figure 8D:
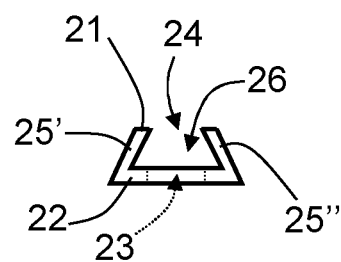
FIG. 8D schematically shows a side view of a fifth example of a washer part.

For the embodiment according to In FIGS. 8A-C, the bent ends of the washer plate do not have to meet depending on the size of the washer aperture 24 formed by means of the curved portions as shown in FIG. 8D. In that case, resistance to compressive forces can even be improved since the bent ends of the washer plate will resist compressive forces better when being angled relative the compressive force than when being configured as a flat surface. Generally, the opposing end portions are bent with an angle of more than 90 degrees and less than 180 degrees relative a flat middle portion of the washer plate 47.

All the above described washer parts can be rather easily manufactured from pieces of sheet metal such as an oblong washer plate of desired material and thickness. There is also many possible ways and orders of performing the operations in order to manufacture the washer part. The pieces of sheet metal can for example be cut to their outer shape and holes made before they are bent. Alternatively, a rather long piece of sheet metal can first be bent along its length and thereafter divided into smaller pieces which are provided with holes in order to form the washer parts. Hence, there are a lot of different ways in how these washer parts can be produced in an easy and cost-efficient manner.

Another way of producing a washer part made of thin sheet metal could be to use a pipe of desired dimensions and thickness of the pipe wall. In FIGS. 9A-9C, a circularly shaped thin-walled pipe section 57 as shown in FIG. 9A is used as starting material and is compressed to provide a washer part 50 having an oblong cross sectional area as shown in FIG. 9B. The flattened portions will thus correspond to the first washer portion 21 and second washer portion 22 formed as essentially flat surfaces. These flattened parts could be provided with overlapping holes or slits 23, 24 in order to fit a screw through the washer part 50, here constituting washer apertures. The flattened parts are connected by bent parts serving as connecting washer portions 25', 25" so as to create a gap 26 between the spaced apart first washer portion 21 and second washer portion 22.

Hence, a flattened thin-walled pipe cut in sections can also serve as a washer part 50 having thin sheet metal with flat surfaces for abutment against the head of a screw and the edges of a bore or hole. This embodiment may thus be rather strong in its construction compared to the embodiments described above since it has two connecting washer portions 25', 25" and a continuous envelope surface which also will contribute to an increased strength.

In the FIGS. 10-13 there are a few other examples of how washer parts can be designed in general if not being produced from sheet metal.

The washer part 60 in FIG. 10 is essentially built up as the washer part in FIG. 5, but is not made from sheet metal. The washer part 60 thus has a first washer portion 21 and second washer portion 22 with flat surfaces. The first washer portion 21 and second washer portion 22 are also provided with washer apertures 23, 24 in order to fit onto a screw. There is also a connecting washer portion 25 only at one side in order to create a gap 26. Hence, this washer part can be made by means of moulding. Such an element could for example be made by using a suitable metal, metal blend, polymer or polymer blend for moulding.

The washer part 70 in FIG. 11 is similar to the one in FIG. 10, but in FIG. 11 the washer part 70 is provided with a connecting washer portion 25 on three sides and there is only one open side for the gap 26. This will thus increase the rigidity and load bearing properties of the washer part 70 while of course also reduce the flexibility and possibility to be somewhat compressed.

Figure 12:
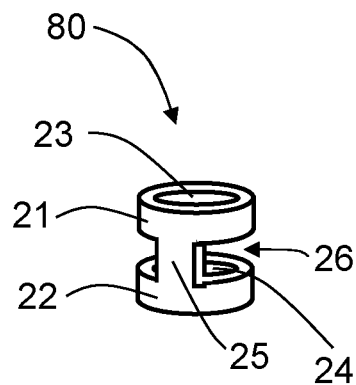
FIG. 12 schematically shows a perspective view of a tenth example of a washer part.

In FIG. 12 still another washer part 80 is disclosed, which washer part 80 basically is a cylinder which has been provided with a cutout such that washer apertures 23, 24, a connecting washer portion 25 and a gap 26 are formed.

Figure 13:
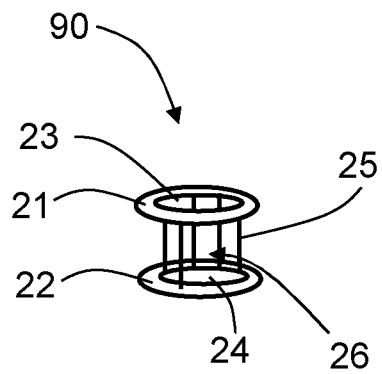
FIG. 13 schematically shows a perspective view of an eleventh example of a washer part.

In FIG. 13, a washer part 90 according to still another possible design is disclosed. Circularly shaped discs serve as the first washer part 21 and second washer part 22 which are connected by a number of bars serving as the connecting washer portion 25. Each of the discs serving as the first washer part 21 and second washer part 22 is provided with a corresponding washer aperture 23, 24 in order to fit onto a screw. The first end part 3 of a tether 2 is intended to be fitted between the bars serving as the connecting washer portion 25 where said bars are more sparsely distributed in one sector in order to facilitate insertion of the first end part 3.

Figure 14:
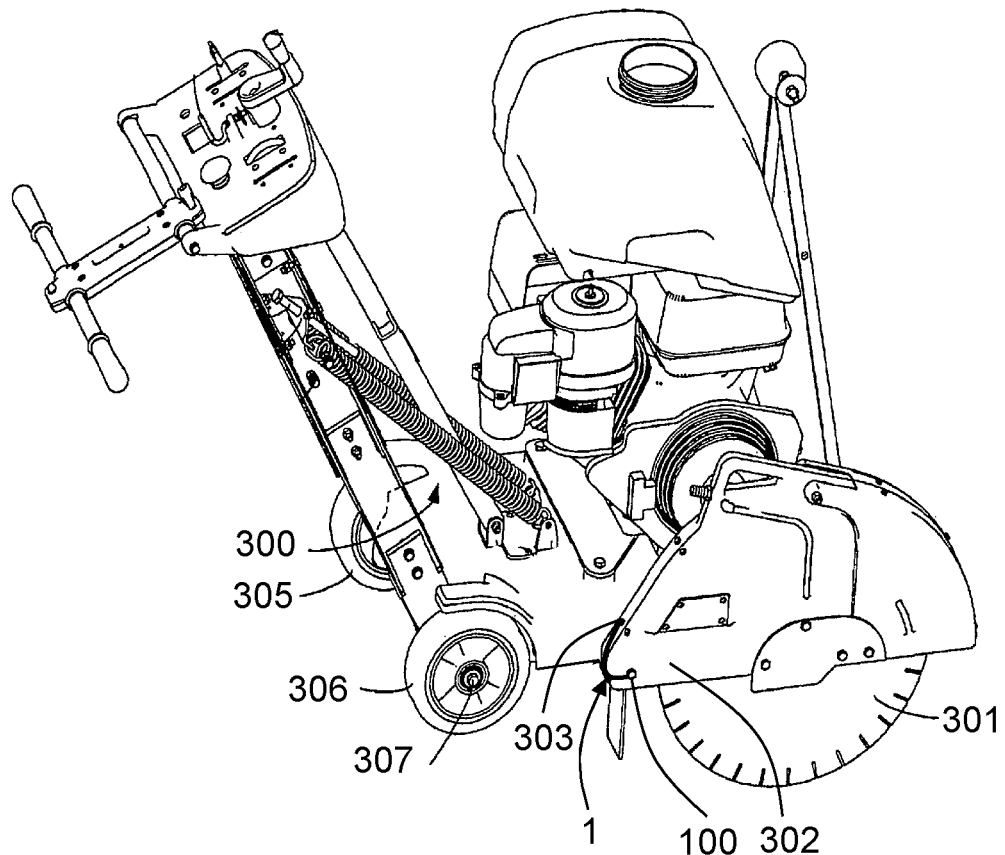
FIG. 14 schematically shows a perspective view of an engine-powered tool provided with a screw and a screw-retaining device according to the present disclosure.

In FIG. 14, a tool in the form of a power cutter 300 suitable for cutting concrete, asphalt or other hard materials on the ground is shown, having two wheels 305, 306 on a wheel axis 307. The machine 300 comprises a cutting blade 301 which has been provided with a blade guard 302. The blade guard 302 has been provided with a screw-retaining device 1 as disclosed earlier. The screw-retaining 1 device is attached at one end to an attachment point 303 on the blade guard 302, and its other end is attached to a screw 100 used for securing the blade guard 302 to the machine 300 in a protective position. The screw-retaining device 1 will thus keep the screw 100 attached to the blade guard 302 even if the screw 100 is unscrewed and completely removed from the bore or hole, here a mounting hole, where it is located when the blade guard 302 is in its protective position. The blade guard 302 may thus be completely removed while the screw 100 is prevented from being lost.

The arrangement of being able to completely remove the screw 100 from its initial mounting hole without risking to lose the screw is advantageous if there is a desire to relocate the cutting blade 301 and the blade guard 302 to another position. This can for example be the case if the cutting blade 301 is arranged to be fitted on both sides of the machine 300, the cutting blade 301 and the blade guard 302 then being arranged to be moved from one side to another. When the blade guard 302 is moved from one side to another, the screw 100 will enter through another mounting hole in the blade guard 302, which other mounting hole is positioned on the other side of the blade guard 302 relative the initial mounting hole. The screw 100 then has to be completely removed from the initial mounting hole in the blade guard 302 and moved to the other mounting hole.

It is obvious that the screw-retaining device 1 can be used for a screw fastening essentially any kind of protective cover or part on any kind of machine.

The present disclosure relates to a screw-retaining device 1 comprising a connecting element 2. The connecting element 2 that can be regarded to be in the form of a tether may comprise a wire, cable, strap or other device which serves for securing a screw and prevent it from being lost. The tether may be described to comprise three different portions:

A first end part 3, constituting a retaining part, adapted to be attached to a screw 100. This part is preferably provided with a loop, ring or similar feature in order to be fitted onto the stem of a screw 100. The size of the loop or attachment portion should be adapted to fit the size of the screw 100 which shall be retained.

A second end part 4, constituting an attachment part, provided with means for attachment to an attachment point at an object 15. This part can for example also be in the form of a loop or similar which is arranged to be securely attached by a screw or bolt to a device at a desired location. However, this part could also be adhesively attached to a surface, being welded to an attachment point or attached by any suitable means to an attachment point. The important feature is that the attachment part is adapted to be fastened and secured to an attachment point in a suitable way.

An intermediate part 5, constituting a connecting portion, that is arranged to connect the first end part 3 and the second end part 4. This intermediate part 5 can for example comprise a wire, cable, cord, lace, thin thread or strap. The intermediate part is preferably made to be flexible, e.g. made from a flexible material which may be easily bent or from a number of connected linking elements, e.g. a normal chain made by connecting torus shaped links.

It shall be noted that all these parts 3, 4, 5 that constitute the tether 2 may be made from the same material, and even from the same piece of material, e.g. could a wire or cable be used which is formed to have a loop at each end serving as retaining portion and attachment portion.

When the washer part is fitted onto a screw, the gap or space is created between the first and second washer portions in the longitudinal direction of a screw onto which the washer part is fitted. This means that there is a space or gap created in close vicinity to the screw stem 19 onto which the washer part is fitted. The washer part should be designed such that when the screw is fastened in a bore, one washer portion, e.g. the first washer portion, will abut against the head of the screw, while the other washer portion, e.g. the second part, will abut against the edge or surface area surrounding the bore or hole where the screw is attached. In between these two washer portions, there will thus be a space or gap.

The washer part 20 shall according to some aspects be designed to be provided with washer apertures 23, 24 large enough such that it is able to be fitted onto the screw stem 19 while the washer apertures 23, 24 also shall be small enough and adapted or designed to safely abut against the edges of the bore or hole 16 and the screw head 13. The washer apertures 23, 24 are preferably designed to be properly sized without the need of using an additional washer plate or the like element to form part of the washer part 20 in order to prevent the washer part 20 to move pass a screw head 13.

By spacing apart the first washer portion 21 and the second washer portion 22, and having a connecting washer portion 25, at least some of the compressive forces from the screw 100 when being fastened will be absorbed by the connecting washer portion 25. In addition, the washer part 20 may prevent or reduce frictional forces working on the first end part 3 from the turning torque when attaching or detaching the screw 100. If the washer part 20 is completely prevented from rotating during screwing of the screw 100, the washer part 20 will absorb all the frictional forces from attaching or detaching the screw 100.

The present disclosure is not limited to the example above, but may vary freely within the scope of the appended claims. For example, when a screw is referred to, any threaded fastening means is meant, such as any type of threaded bolt or similar. The screw comprises a screw stem 19 which in turn comprises a threaded portion 12. There need not be an upper stem part, but the threads may run all the way to a screw head. When there is an upper stem part, it can have a diameter that is equal to, or falls below, a largest thread diameter $d_{tmax}$.

The washer part can as described have many shapes and forms, and does not have to look as a typical washer. When a washer part is referred to, any such suitable part is meant, having two parts separated by a gap, into which gap the first end part can be inserted. The washer part can according to some aspects be regarded as a distance element.

The end parts 3, 4 do not have to constitute absolute ends of the connecting element 2, but only ends to the intermediate part 5. It is conceivable that the connecting element 2 comprises several end parts that are connected by a plurality of intermediate parts in a chain such that a plurality of screws can be fastened to one and the same connecting element 2.

The first end part need not be resilient and have a certain relaxed state. The connecting element is according to some aspects made in a non-resilient material such as a thread or similar having a loop as the first end part. In that case, a diameter of a largest circle within a retaining aperture of that loop will fall below the largest thread diameter of a screw that is intended to be retained when it has fallen and the intermediate part 5 since the loop then will have a narrowed retaining aperture that will engage the threads. Other examples are conceivable, such that the first end part generally is arranged to engage the threads.

In an uncomplicated version, the washer part can be a cube- or brick-shaped element which is provided with a through-going hole for fitting the washer part to a screw and provided with a gap or opening such that forming two washer apertures are formed, where the gap is arranged to receive the first end part encircling the screw. The geometrical outer shape of the washer part is in general of less importance, even though it may be advantageous to use a flat surface for abutment to the surface where the hole or bore 16 is located.

The washer part could for example be made of a tubular element, e.g. shaped as a spool, bobbin or cylinder, having a through-going hole and provided with one or several cutouts in the side wall in order to receive the first end part of the tether. In particular a spool or bobbin, having an enlarged rim, could be a useful shape since it will comprise flat surfaces at its ends forming the first washer portion respective second washer portion of the washer part abutting against the bore surface area and the head of the screw.

The screw-retaining device has mostly been exemplified herein as being made of metal, in particular sheet metal, but can of course also be made of other materials such as plastics or other kind of polymers.

The first end part may be in the shape of a loop and being somewhat oval or drop-shaped. It can of course also have other shapes, e.g. a circular ring or a ring having a cut-out portion, similar to a horse shoe, or other gripping portion. The first end part, the retaining portion of the tether, regardless of its shape, is according to some aspects made to be flexible and resilient in order to better grip around the upper stem part 14. In case the gripping portion is a loop, or any shape which is noncircular in its relaxed state, it could be made such that it needs to flex out to be fitted onto the screw, and possibly needed to be screwed to easily pass the threaded portion 12 of the screw 100, such that the threaded portion 12 will prevent the first end part 3 from slipping or sliding off the upper stem part 14 of the screw once the retaining portion is fitted onto the screw 100. This can for example be achieved by a tether 2 which is partly or completely made of metal fibres, e.g. a wire or cable, or any suitable enduring material, e.g. a polymer designed to be flexible.

The first end part 3 can in this case be made by forming a loop of the wire which inherits flexibility from the metallic cords forming the tether 2. In order to use the loop or retaining portion for resiliently gripping around the upper stem part 14 of the screw, the washer part 20 can be according to some aspects have a gap 26 where the first end part 3 of the tether is intended to be fitted that is designed such that it both protects the first end part 3 from wear, e.g. from compressive forces and/or friction forces, while also enabling the first end part 3 to be in contact with, or at least allow its contracting forces to work on, the upper stem part 14 in order to be retained on the screw.

The washer part 20 and the connecting element 2, for example a tether, being part of the screw-retaining device 1 are generally constituted by separate elements, i.e. they are not necessarily attached to each other when removed from the screw 100.

When terms such as levelled, parallel, flat and perpendicular are used, as well as numerical values such as 180 degrees, they are not intended to be interpreted as mathematically exact, but to lie within what is practically and normally obtained forth the kind of parts referred to.

Generally, the present disclosure relates to a screw-retaining device 1 comprising a connecting element 2 which in turn comprises a first end part 3, a second end part 4 and an intermediate part 5 that connects the end parts 3, 4, where the first end part 3 comprises an at least mainly circumferentially running part 6 that at least partly encompasses a retaining aperture 7 that is arranged to engage the threads 9 of a screw 100 that is intended to be retained, and where the second end part 4 is arranged to be attached to an object 8. The screw-retaining device 1 further comprises a washer part 20 which in turn comprises a first washer portion 21, having a first washer aperture 23, and a second washer portion 22, having a second washer aperture 24, where the washer portions 20, 22 are spaced apart by a gap 26 and are connected by at least one connecting washer portion 25, where the washer apertures 23, 24 are aligned across the gap 26 such that a combined washer aperture 23, 24 is formed that admits passage of a screw stem 19, where the first end part 3 is arranged to be positioned in the gap 26 before a screw 100 that is intended to be retained is mounted to the screw-retaining device 1 via the retaining aperture 7 and the washer apertures 23, 24.

According to an example, a diameter $d_{relax}$ of a largest circle 11 within the retaining aperture 7 in a relaxed state falls below a largest thread diameter $d_{tmax}$ of a screw 100 that is intended to be retained.

According to an example, the retaining aperture 7 is arranged to be aligned with the washer apertures 23, 24.

According to an example, the retaining aperture 7 has an elongated form in a relaxed state, and where the retaining aperture 4 is arranged to have said elongated form temporarily altered from the relaxed state to an expanded state such that an expanded retaining aperture 11' is formed, where the diameter of a largest circle 11' within the expanded retaining aperture 7' is increased to an expanded circle diameter $d_{exp}$.

According to an example, the washer part 20, 20', 30, 40, 50 is made from thin sheet metal 27, 37, 47 or a flattened thin walled pipe 57.

According to an example, the sheet metal forming the washer part 20, 20', 30, 40 is bent such that the first washer portion 21 and second washer portion 22 of the washer part 20, 20', 30, 40, 50 comprise two parallel flat surfaces that are arranged to be perpendicular to the longitudinal direction of a screw when the washer part 20, 20', 30, 40, 50 is fitted onto a screw stem 19, where said first washer portion 21 and second washer portion 22 are connected by an intermediate bent portion or portions serving as the connecting washer portion 25 25, 25', 25".

According to an example, each of the first washer portion 21 and second washer portion 22 of the washer part 30 is provided with a corresponding slit 23', 24', which slits 23', 24' constitute washer apertures and are designed to face different directions of the respective washer portions 21, 22 and partly overlap each other such that a they form a combined washer aperture 23', 24' through which a screw stem 19 may be fitted.

According to an example, said first end part 3 of the connecting element 2 is in the shape of a loop.

According to an example, said first end part 3 of the connecting element 2 is made to be flexible and resilient.

According to an example, said connecting element 2 at least partly is made of metal.

According to an example, said washer part 20, 20', 30, 40, 50, 60, 70, 80, 90 is arranged to be fitted onto the screw stem 19 together with said first end part 3 of the connecting element 2 such that said first end part 3 is in contact with the screw 100.

According to an example, said washer part 20, 20', 30, 40, 50, 60, 70, 80, 90 and connecting element 2 are separate elements.

Generally, the present disclosure also relates to a screw-retaining kit comprising a screw-retaining device 1 according to the above in combination with a screw 100.

Generally, the present disclosure also relates to an engine-powered tool that comprises a screw-retaining kit according to the above.

The invention claimed is:

1. A screw-retaining device comprising a connecting element which in turn comprises a first end part, a second end part and an intermediate part that connects the end parts, wherein the first end part comprises an at least mainly circumferentially running part that at least partly encompasses a retaining aperture that is arranged to engage the threads of a screw that is intended to be retained, wherein the second end part is arranged to be attached to a separate object, wherein the screw-retaining device further comprises a washer part, the washer part comprising a first washer portion having a first washer aperture, and a second washer portion having a second washer aperture, wherein the first and second washer portions are spaced apart by a gap and are connected by at least one connecting washer portion, wherein the first and second washer apertures are aligned across the gap such that a combined washer aperture is formed that admits passage of a screw stem, wherein the first end part is arranged to be positioned in the gap before a screw that is intended to be retained is mounted to the screw-retaining device via the retaining aperture and the first and second washer apertures.

2. The screw-retaining device according to claim 1, wherein a diameter ($d_{relax}$) of a largest circle within the retaining aperture in a relaxed state falls below a largest thread diameter ($d_{tmax}$) of a screw that is intended to be retained.

3. The screw-retaining device according to claim 1, wherein the retaining aperture has an elongated form in a relaxed state, and where the retaining aperture is arranged to have said elongated form temporarily altered from the relaxed state to an expanded state such that an expanded retaining aperture is formed, wherein the diameter of a largest circle within the expanded retaining aperture is increased to an expanded circle diameter ($d_{exp}$).

4. The screw-retaining device according to claim 1, wherein the washer part is made from thin sheet metal or a flattened thin walled pipe.

5. The screw-retaining device according to claim 4, wherein the sheet metal forming the washer part is bent such that the first washer portion and the second washer portion of the washer part comprise two parallel flat surfaces that are arranged to be perpendicular to a longitudinal direction of a screw when the washer part is fitted onto the screw stem, wherein said first washer portion and the second washer portion are connected by an intermediate bent portion or portions serving as the connecting washer portion.

6. The screw-retaining device according to claim 1, wherein each of the first washer portion and the second washer portion of the washer part is provided with a corresponding slit, the corresponding slits constitute washer apertures and are designed to face different directions of the respective washer portions and partly overlap each other to form the combined washer aperture through which the screw stem may be fitted.

7. The screw-retaining device according to claim 1, wherein said first end part of the connecting element is in the shape of a loop.

8. The screw-retaining device according to claim 1, wherein said first end part of the connecting element is made to be flexible and resilient.

9. The screw-retaining device according to claim 1, wherein said connecting element at least partly is made of metal.

10. The screw-retaining device according to claim 1, wherein said washer part is arranged to be fitted onto the screw stem together with said first end part of the connecting element such that said first end part is in contact with the screw.

11. The screw-retaining device according to claim 1, wherein said washer part and the connecting element are separate elements.

12. A screw-retaining kit comprising a screw-retaining device in combination with a screw, the screw retaining device comprising:
a connecting element which in turn comprises a first end part, a second end part and an intermediate part that connects the end parts, wherein the first end part comprises an at least mainly circumferentially running part that at least partly encompasses a retaining aperture that is arranged to engage the threads of a screw that is intended to be retained, wherein the second end part is arranged to be attached to a separate object, wherein the screw-retaining device further comprises a washer part, the washer part comprising a first washer portion having a first washer aperture, and a second washer portion having a second washer aperture, wherein the first and second washer portions are spaced apart by a gap and are connected by at least one connecting washer portion, wherein the first and second washer apertures are aligned across the gap such that a combined washer aperture is formed that admits passage of a screw stem, wherein the first end part is arranged to be positioned in the gap before a screw that is intended to be retained is mounted to the screw-retaining device via the retaining aperture and the first and second washer apertures.

\* \* \* \* \*